United States Patent [19]

Maheu

[11] 4,071,158

[45] Jan. 31, 1978

[54] SCREW FASTENING DEVICE

[76] Inventor: Joseph S. Maheu, 10 Ruddington Drive, Apartment 10 North, Suite 307, Willowdale, Ontario, Canada

[21] Appl. No.: 666,518

[22] Filed: Mar. 12, 1976

Related U.S. Application Data

[63] Continuation-in-part of Ser. No. 603,477, Aug. 11, 1975, abandoned.

[51] Int. Cl.² .............................................. H02G 3/08
[52] U.S. Cl. ........................................ 220/3.2; 85/33; 174/54; 220/3.6
[58] Field of Search .................... 85/33; 151/19 R; 174/53, 54, 57; 220/3.3, 3.5, 3.7, 3.2, 3.6

[56] References Cited

U.S. PATENT DOCUMENTS

| | | | |
|---|---|---|---|
| 2,294,745 | 9/1942 | Goetz | 85/33 |
| 2,524,481 | 10/1950 | Schermuly et al. | 85/33 UX |
| 2,705,983 | 4/1955 | Guadagna | 85/33 X |
| 2,814,324 | 11/1957 | Shur | 85/33 X |
| 3,151,652 | 10/1964 | Zahodiakin | 85/33 X |
| 3,151,653 | 10/1964 | Zahodiakin | 85/33 X |
| 3,157,215 | 11/1964 | Zahodiakin | 85/33 X |
| 3,160,187 | 12/1964 | Zahodiakin | 85/33 X |
| 3,352,341 | 11/1967 | Schertz | 85/33 X |
| 3,695,139 | 10/1972 | Howe | 85/33 |
| 3,863,037 | 1/1975 | Schindler et al. | 174/58 |
| 3,876,821 | 4/1975 | Pringle | 174/53 |
| 3,895,732 | 7/1975 | Robinson et al. | 174/54 |

FOREIGN PATENT DOCUMENTS

| | | | |
|---|---|---|---|
| 424,825 | 2/1947 | Italy | 85/33 |
| 1,270,240 | 4/1972 | United Kingdom | 85/33 |

Primary Examiner—Roy D. Frazier
Assistant Examiner—Thomas J. Holko
Attorney, Agent, or Firm—Rogers, Bereskin & Parr

[57] ABSTRACT

Screw fastening devices are described for use on structures such as electrical outlet boxes. According to the invention, a screw fastening device includes a support adapted to be mounted on said structure and defining two convergent opposed wall surfaces. A pair of screw-engaging members are arranged in sliding contact with the respective convergent wall surfaces. Spring means bias the members in the direction of convergence of said wall surfaces so as to normally maintain adjacent portions of said members in cooperating relationship, said adjacent portions being formed with recesses having internal grooves which together define a thread complimentary to that of said screw. In use, the screw can be inserted between said members, causing alternate relative movement of the members along said wall surfaces in directions against the biassing effect of the spring means and back to their normal positions under the action of said spring means as the thread on the screw rides over the corresponding thread defined by said recesses, the screw being held in its inserted position by said members and the thread defined by said recesses allowing the screw to be axially displaced by rotation in the appropriate direction.

5 Claims, 8 Drawing Figures

SCREW FASTENING DEVICE

This application is a Continuation-in-part of application Ser. No. 603,477 filed Aug. 11, 1975, now abandoned.

This invention relates to screw fastening devices used, for example, as part of an electrical outlet box to receive and retain screws connecting a receptacle to the box.

An outlet box is conventionally secured to a wall, beam or the like in a building during construction thereof. A receptacle is subsequently fastened in the box when the electrical wiring is installed in the building, so that the box forms a housing for the rear part of the receptacle and for the connections between the receptacle and the electrical system of the building. The receptacle is secured to the box by means of a pair of screws, one at each end of the receptacle, each of which is screwed into a threaded hole in a tab on the box. Each tab is stamped out of the relevant wall of the box and folded down at right angles to the wall in a position to receive the screw.

It will be appreciated that the operation of securing a receptacle in such an outlet box can be somewhat laborious in that each screw must be individually screwed into the relevant tab on the box. Comparatively long screws are often used and, it can therefore take several minutes to secure a single receptacle. Considering that an average house often has 30 or more receptacles, the time taken to fasten receptacles in all of the outlet boxes is considerable.

Proposals have been made to facilitate fastening of a receptacle to an outlet box by providing on the box screw fastening devices into which the receptacle-securing screws can be pressed without rotation.

U.S. Pat. No. 3,526,703 discloses an example of a screw fastening device. However, such conventional devices are not found to operate reliably. Further, they they are prone to becoming clogged with foreign material such as plaster.

An object of the invention is to provide an improved screw fastening device for use on a structure such as an electrical outlet box to which a receptacle or other component is to be fastened by at least one screw.

According to one aspect of the invention, the device includes a support adapted to be mounted on said structure and defining two convergent opposed wall surfaces. A pair of screw-engaging members are arranged in sliding contact with the respective convergent wall surfaces. Spring means bias the members in the direction of convergence of said wall surfaces so as to normally maintain adjacent portions of said members in cooperating relationship, said adjacent portions being formed with recesses having internal grooves which together define a thread complimentary to that of said screw. In use, the screw can be inserted between said members, causing alternate relative movement of the members along said wall surfaces in directions against the biasing effect of the spring means and back to their normal positions under the action of said spring means as the thread on the screw rides over the corresponding thread defined by said recesses, the screw being held in its inserted position by said members and the thread defined by said recesses allowing the screw to be axially displaced by rotation in the appropriate direction. According to another aspect of the invention, the device includes a support adapted to be mounted on the box or other structure and including two convergent side walls. A pair of plate are mounted in the support and each plate includes a first limb positioned in sliding contact with a respective one of the walls of the support and a second limb which is inclined with respect to the first limb towards the second limb of the other plate. Spring means bias the plates outwardly in the direction of convergence of said walls so as to normally maintain opposing end portions of the respective second limbs of the plates in end to end relationship. The said opposing end portions of the second limbs of the plates are formed with recesses which together define an aperture to receive a screw, and the internal walls of the recesses are formed with grooves which together define a thread complementary to that of the screw to be received in the aperture. In use, the screw can be inserted into and pushed through the said aperture, causing alternate relative movement of the plates along the said side walls in a direction against the biassing effect of the spring means and back to their normal positions under the action of said means as the thread on the screw rides over the corresponding thread inside the aperture. The screw is held in its inserted position by the plates and the thread inside the aperture allows the screw to be subsequently rotated to axially displace the screw in the appropriate direction.

In the case of an electrical outlet box, a pair of fastening devices according to the invention will normally be secured respectively to the inner surfaces of the top and bottom walls of the box in positions to receive the securing screws of the receptacle. Similar arrangements will be employed where a switch or other electrical component is to be fastened in the box.

The invention will be better understood by reference to the accompanying drawings in which.

Figure 1:
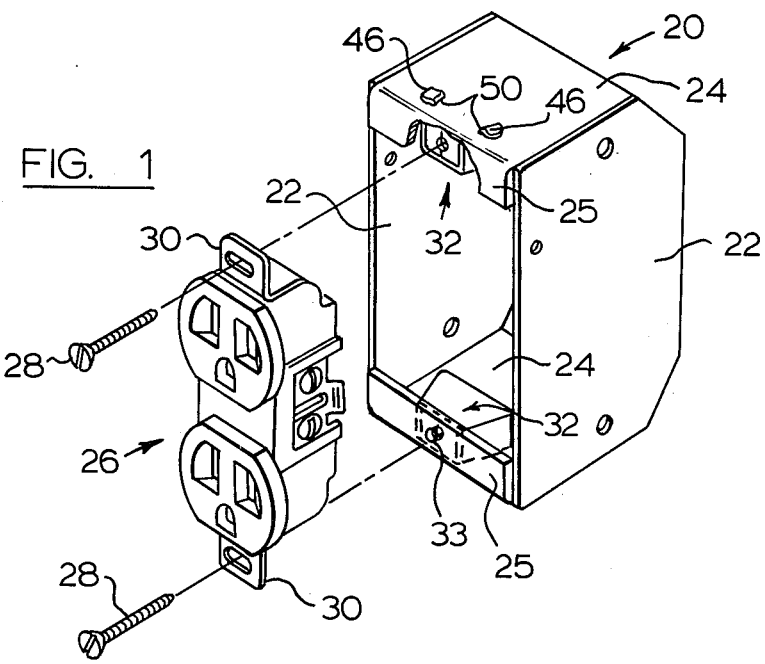
FIG. 1 is an exploded perspective view of an electrical outlet box fitted with a pair of fastening devices according to the invention, for use in securing a receptacle in the box.

Referring first to FIG. 1, an electrical outlet box is generally designated 20 and comprises side walls 22, top and bottom walls 24 and a rear wall (not visible) which conforms in shape with the rearward extremities of the side walls 22. Extensions 25 on the top and bottom walls 24 are deflected towards one another to form inwardly-directed flanges, the purpose of which will be described later. Box 20 also defines openings such as are normally provided on an outlet box for securing the box to a wall of a building in conventional fashion.

A duplex electrical receptacle 26, also of conventional construction, is adapted to be fitted into the outlet box 20 by screws 28 which pass through slots in top and bottom flanges 30 of the receptacle. A pair of fastening devices indicated at 32 are provided inside the box to receive the screws 28. The devices 32 are mounted on the inside surfaces of the respective top and bottom walls 24 of the box 20 behind the flanges 25. Each flange is formed with an aperture 33 through which a screw 28 can be inserted into the relevant device 32. The apertures are of slightly larger diameter than the screws 28.

Figure 2:
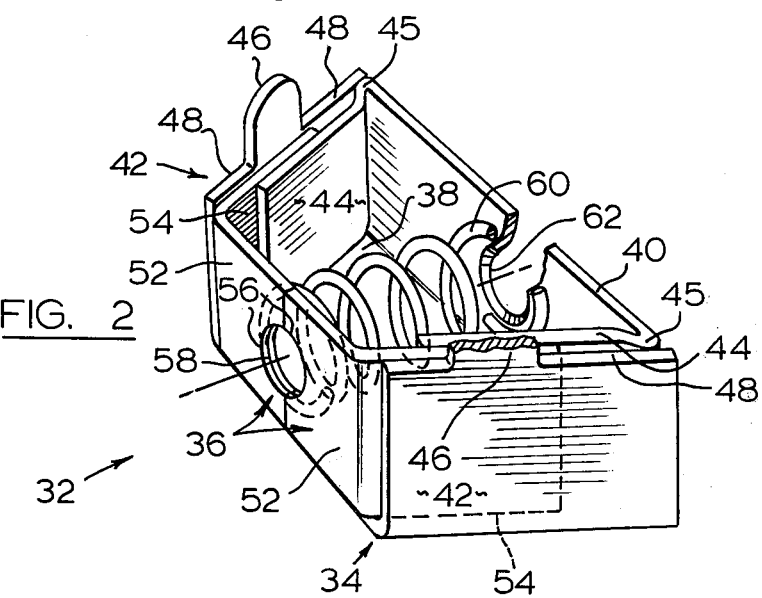
FIG. 2 is a perspective view of one of the fastening devices shown in FIG. 1, parts of the device being broken away for clarity of illustration.
Figure 3:
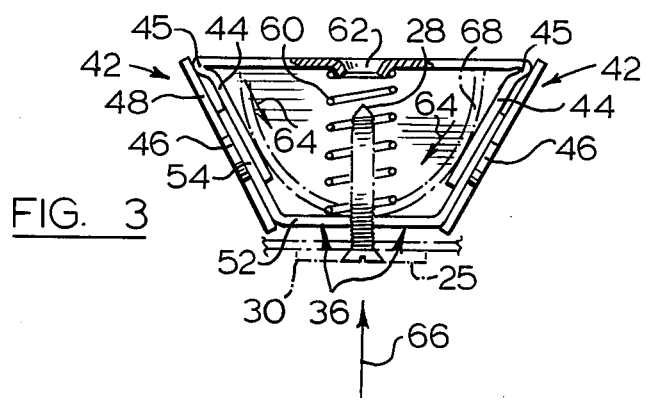
FIG. 3 is a plan view corresponding to FIG. 2 showing the fastening device with a screw fitted therein.

Referring now to FIGS. 2 and 3, each fastening device comprises a support 34 for a pair of plates 36 adapted to slidably engage the relevant one of the screws 28 (FIG. 1), as will be described. The support comprises a base portion 38, an end wall 40 and a pair of side walls 42 which converge in the direction from which a screw is inserted into the device. A secondary side wall portion 44 is provided parallel to and spaced from each main side wall 42. Each secondary side wall portion 44 defines with the associated main side wall 42 a slot in which the relevant one of the plates is slidably received. The secondary side wall portions 44 are integral with the end wall 40 and are bent inwardly, each at an acute angle with respect to said end wall 40 as indicated at 45.

Each of the side walls 42 is formed with an upstanding tab 46 positioned in the centre region of the side wall so as to leave a land 48 at each side thereof. Appropriately positioned slots 50 are formed in the top and bottom walls of the outlet box 20 (FIG. 1) and each device is secured to the box by inserting the respective tabs 46 through the slots 50 and bending the tabs outwardly, as can be seen in FIG. 1. The lands 48 then bear on the inner surface of the relevant wall 24 of the box to ensure that the fastening device is secured in stable fashion to limit rocking.

As can be seen from FIG. 1, when the device is fitted to the outlet box, the support 34 encloses the internal parts of the device thereby reducing the risk of foreign material entering and possibly clogging said parts. The risk is further reduced by the fact that the devices are mounted inside the box and are shielded by the flanges 25.

The support 34 is formed from an integral metal die stamping which is folded to the shape shown in the drawings. The end wall 40 and the side walls 42 are each joined to the base 38 along their respective lower edges and are initially disposed in the same plane as the base 38. Also, the secondary side wall portions are initially in the same plane as the end wall 40.

Each of the plates 36 comprises an inner limb 52 and an outer limb 54, the limbs being positioned at an obtuse angle with respect to one another such that the inner limbs 52 extend parallel to the end wall 40 of the support 34. The opposed end portions of the respective plates 36 are formed with semi-circular recesses 56 which co-operate to define a circular aperture to receive the relevant one of the screws 28. Grooves 58 are formed in the walls of the recesses and co-operate to form an internal thread complementary to the external thread of screws 28.

A helical compression spring 60 extends between the end wall 40 and the inner limbs 52 of the plates 36. As can be seen, the spring 60 is positioned with its axis coincident with the centre of the aperture formed by the recesses 56 and the spring is dimensioned such that a screw 28 inserted through the aperture can pass through the centre of the spring. In other words, the spring acts as a guide for the screw. The end wall 40 is formed with an aperture 62 which is aligned with the aperture at the other end of the spring so that a particularly long screw can project through the wall 40.

Spring 60 acts on the inner limbs 52 of the plates 36, to urge the plates in the direction of convergence of the side walls 42, as indicated by the arrows 64 in FIG. 3 This causes the opposing end portions of the inner limbs 52 of plates 36 to be maintained in abutting end to end relationship.

The aperture formed by the recesses 56 is dimensioned such that the screw 28 can be screwed into the aperture in normal fashion. However, the intention is that the screw 28 will be inserted into and pushed through the aperture in the direction of arrow 56 in FIG. 3 without rotation. The aperture 33 in the relevant flange 25 in front of the device guides the screw, ensuring that it enters the aperture squarely, and engages both of the plates 36.

Insertion of screw 28 will initially cause the plates 36 to move inwardly of the device along the side walls 42 against the biassing effect of spring 60. The opposing end portions of the inner limbs 52 will accordingly move apart due to the inclination of the side walls 42 at the first turn of the thread on the screw rides over the corresponding portion of the thread inside the aperture. Spring 60 will then return the plates in the direction of arrow 64 until the next turn of the thread on screw 28 again causes the plates 36 to move inwardly of the device. This alternate relative movement of the plates along the side walls 42 against the biassing effect of the spring 60 and back to their normal positions under the action of the spring will be repeated until the screw reaches the fully inserted position in which it is shown in FIG. 3. Part of the receptacle 26 is indicated at ghost outline in the position in which it is held by screw 28. It may be necessary to rotate the screw to finally tighten it in the device. However, it will be appreciated that the fastening devices 32 greatly simplify the operation of fitting the receptacle to the outer box. If the receptacle is to be removed, the screws 28 can be unscrewed by rotating them in the counter-clockwise in conventional fashion.

In the illustrated embodiment, the angle of convergence of the side walls 42 (that is, the angle between the walls) is approximately 60°. The device has been found to operate satisfactorily in practice with this angle of convergence, although it is, of course, to be appreciated that other angles may be used. However, it should be noted that if the angle of convergence decreases, the plates 36 can be more easily moved inwardly of the device, but they must move further before their inner limbs separate sufficiently to allow the thread on a screw inserted into the device to ride over the corresponding thread inside the aperture defined between the plates 36. Conversely, if the angle of convergence is increased, it becomes more difficult to move the plates inwardly but the extent of movement required to allow the respective threads to ride over one another is reduced.

It should be noted that the thread on the screw 28 and the complementary thread inside the aperture are of the type conventionally employed for screws used to secure electrical receptacles. Other threads may, of course be used. In fact, even square section threads could be used.

Figure 4:
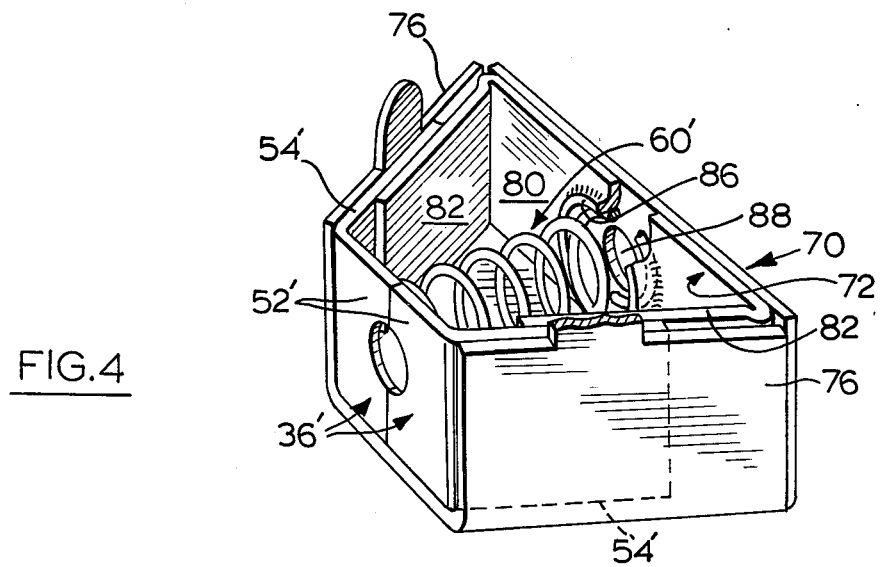
FIG. 4 is a view similar to FIG. 2 illustrating a modified form of fastening device.
Figure 5:
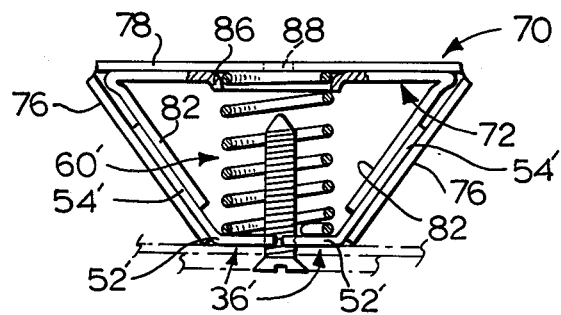
FIG. 5 is a plan view according to FIG. 4.
Figure 6:
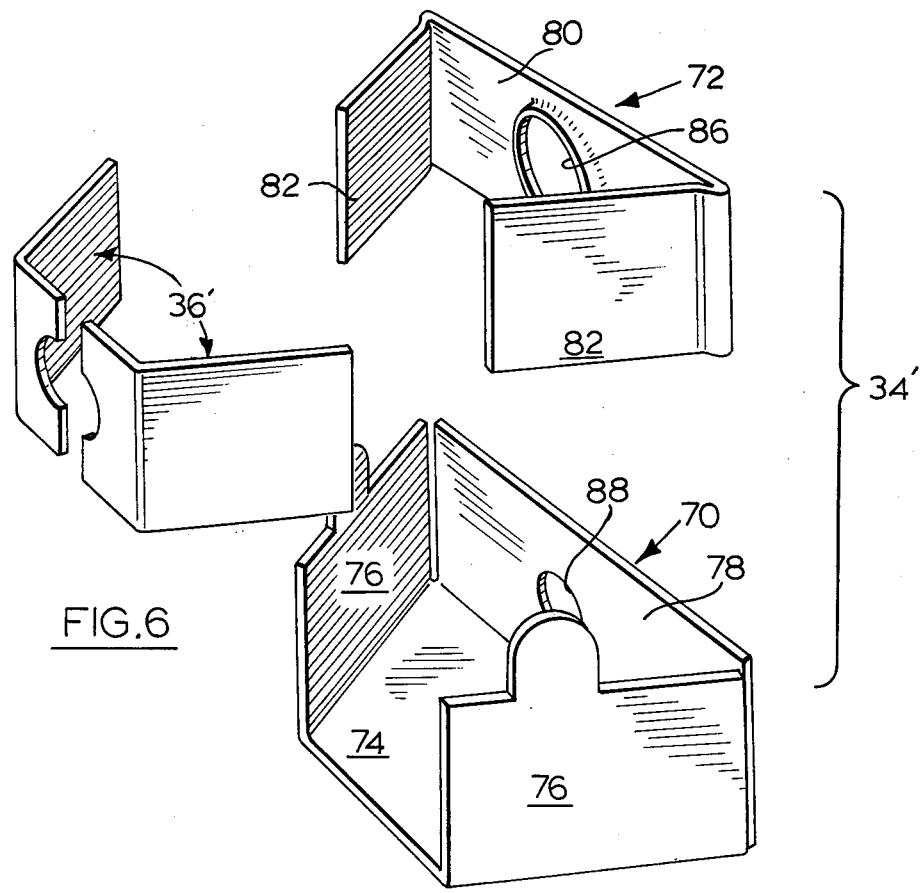
FIG. 6 is an exploded perspective view of the device of FIGS. 4 and 5.

Reference will now be made to FIGS. 4 to 6 in describing a modified form of screw-fastening device. Primed reference numerals have been used in FIGS. 4 to 6 to denote parts which correspond with the parts shown in FIGS. 1 to 3.

The modified device differs from the device described above primarily in that the one piece support 34 of FIGS. 1 to 3 is replaced by a support 34' made up of two parts slidably fitted together. The parts are shown in exploded positions in FIG. 6 and include an outer part 70 and an inner part 72. Part 72 is fitted inside part 70 when the device is assembled, as can be seen from FIGS. 4 and 5. The screw-engaging plates 36' are of the same form as the plates 36.

The outer support part 70 includes a base portion 74 having two upstanding side walls 76 and an end wall 78. The inner part 72 also includes an end wall 80 and two side walls 82 but has no base portion. When part 72 is fitted inside part 70, the two end walls 78 and 80 are arranged in contact with one another and the side walls 82 of part 72 are disposed inwardly of and spaced from the corresponding side walls 76 of part 70. It will be appreciated that the side walls 82 correspond to the secondary side wall portions 44 of FIGS. 2 and 3 and define with side walls 76, slots which slidably receive the plates 36'.

The inner support part 72 is formed in its end wall 80 with an inwardly flared circular opening 86. End wall 78 of part 70 is also formed with a circular aperture 88, this aperture being smaller than aperture 86 and being plain (i.e. non-flared). Aperture 86 is dimensioned so that the spring 60' of the device passes through the aperture and bears against the end wall 78 of part 70 as can be seen in FIGS. 4 and 5. Accordingly, the relevant end of the spring (the rear end in FIG. 4) is located by the flared aperture 86 and cannot become accidentally dislodged.

The opposite end of spring 60' is also located against lateral movement in the embodiment of FIGS. 4 to 6 by shaping the support parts 70 and 72 so that the spring is located approximately at the junctions between the inner limbs 52' and the outer limbs 54' of the screw-engaging plates 36'.

It is believed that the screw fastening device shown in FIGS. 4 to 6 may be simpler to manufacture than the device of the previous embodiment. Also, the spring 60' is positively located against lateral displacement as described above so as to minimize the risk that a spring might accidentally become dislodged, e.g. in transit prior to installation of the device.

Figure 7:
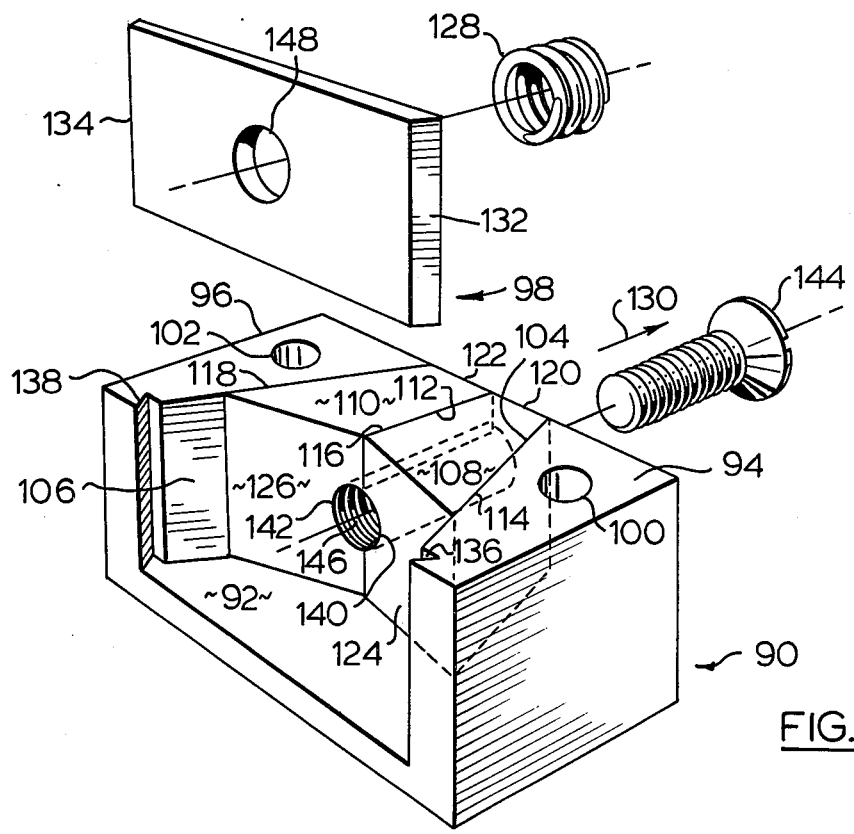
FIG. 7 is an exploded perspective view of a screw fastening device according to a still-further embodiment of the invention.
Figure 8:
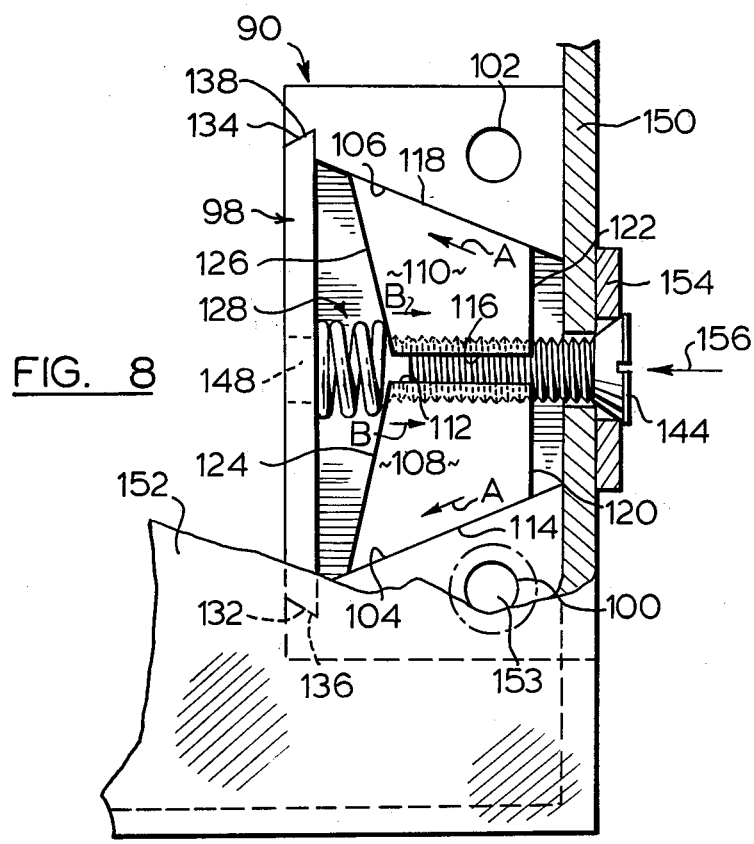
FIG. 8 is a partial vertical sectional view through a structure fitted with the device of FIG. 7.

Reference will now be made to FIGS. 7 and 8 in describing a further embodiment of the invention. It is to be noted that the device of FIGS. 7 and 8 is intended to be manufactured in a plastic material (apart from the compression spring — to be described), although it is of course to be understood that some or all of the device could be made in another material (e.g. steel).

The device shown in FIGS. 7 and 8 includes a support generally designated 90. The support includes a base 92 having upstanding formations 94 and 96 at one face defining side walls of the support. The support also includes an initially-separate end plate 98, which is shown exploded in FIG. 7, and the purpose of which will be described later. It will be noted that the formations 94 and 96 of the support are of generally triangular shape in plan view. The formations are formed with respective apertures 100 and 102 which extend normal to the base 92 of the support and which are intended to receive bolts, rivets or the like for securing the screw fastening device to a structure in use. The generally triangular formations 94, 96 define two convergent, opposed wall surfaces 104 and 106. A pair of screw-engaging members 108 and 110 are mounted between the wall surfaces 104 and 106 in sliding contact with said surfaces and with the base 92. As can be seen, the members 108 and 110 are generally wedge shaped. Each member includes two opposite side faces 112, 114 and 116, 118 respectively. Faces 112 and 116 extend parallel to one another and define co-operating portions of the members. The other side faces 114 and 118 of the members are inclined with respect to the first mentioned side faces 112, 116 respectively and extend parallel to the corresponding wall surfaces 104 and 106 of the support 90. The screw-engaging members also have respective front end faces 120 and 122 respectively, which are disposed at right angles to the cooperating faces 116 and 118, and respective rear end faces 124 and 126. It will be noted that these rear end faces are inclined outwardly with respect to one another at a shallow angle. The purpose of this is to, in effect, define a seat for one end of a helical compression spring 128 arranged to bias the screw-engaging members in the direction of convergence of the wall surrfaces 104, 106; that is, in the direction of arrow 130 in FIG. 7.

Spring 128 extends between the rear faces of the members 108 and 110, and the end plate 98 of support 90. Plate 98 has chamfered ends 132 and 134 which fit into corresponding grooves 136 and 138 in the formations 94 amd 96 of support 90 when the plate is in its position of use. It will be appreciated that plate 98 is moved vertically downwards from the position in which it is shown in FIG. 7 so that its ends engage in the grooves 136 and 138. The plate may be retained in position by cement if necessary, e.g. to avoid dislodgement during transportation of the screw fastening device. However, it will become apparent that the plate will be unable to move out of position when the device is installed in use.

The cooperating surfaces 112 and 116 of the members 108 and 110 are formed with respective elongate recesses 140 and 142 of semi-circular shape in cross-section and dimensioned to receive a screw 144. The recesses are formed with internal grooves, some of which are visible at 146, which cooperate to define a screw thread complimentary to that of screw 144. The end plate 98 of the support has a central aperture 148 which is aligned with the recesses 140 and 142 so that the plate will not form an obstruction if an unusually long screw is used.

FIG. 8 shows the screw fastening device of FIG. 7 in use. In this example, the screw fastening device is shown in use for attaching part of a front panel 150 of an electrical appliance, to a side panel 152. It will of course be appreciated that other, similar scew fastening devices will be used to fasten other parts of panel 150. The support 90 of the screw fastening device is attached to the side panel 152 by bolts, one of which is visible at 153. The support is fixed to panel 152 so that its base 92 is remote from the panel and the end plate 98 is trapped between the base and the panel. Screw 144 has been inserted through an aperture in panel 150 into engagement with the members 108 and 110 of the device. A washer 154 is shown behind the head of screw 144. As in the case of the previous embodiments, screw 144 is inserted, without rotation, (in the direction of arrow 156) directly between the screw-engaging members 108 and 110 so as to engage in the recesses 140 and 142. This causes alternate relative movement of the members 108 and 110 along said wall surface 104 and 106 of the support (in the directions of arrows A) against the biassing effect of spring 128, and back towards their former positions (in the directions of arrows B) under the effect of the spring as the thread on screw 144 rides over the corresponding thread defined by the grooves in recesses 140 and 142. When the screw reaches the fully-inserted position in which it is shown, the numbers 108 and 110 hold the screw in position whilst allowing it to be finally tightened by rotation in the normal fashion. Similarly, the screw can be removed by rotation in the appropriate direction.

The device of FIGS. 7 and 8 may be manufactured by conventional injection moulding techniques using a suitable plastic material. As indicated above other materials may be used; for example, the device may be die cast in metal. Of course some changes in design may be necessary according to the particular manufacturing techniques employed.

It will be apparent that many other modifications are possible within the broad scope of the invention. For example, in the embodiment of FIGS. 7 and 8, recesses may be provided in the end plate 98 and/or in the screw-engaging members 108 and 110 to receive and positively locate the spring. Also, it is to be understood, that in any embodiment, one or more leaf springs or other spring means may be used instead of the helical compression spring described. An example of a leaf spring is indicated in ghost outline at 68 in FIG. 3. According to another alternative, individual springs could be provided for each of the screw-engaging members.

It is also to be understood that screw fastening devices according to the invention may be used in many structures other than those specifically mentioned above. For example, such devices could be used for floor mounted electrical receptacles in which the receptacle is secured to a support bracket on the floor. Fastening devices according to the invention could, for example, be used to secure a removable inspection panel to a wall or other structure in say, an air ventillation system.

What I claim is:

1. An electrical box fitted with at least one screw fastening device to receive a screw for coupling an electrical component to the box, the device comprising:
    a support;
    fastening means attaching said support to a flat surface portion of said electrical box;
    said support including: a base having a flat inner surface; two spaced side walls coupled to said electrical box and supporting said base with its said flat inner surface in spaced parallel relationship to that flat surface portion of the box, said side walls of the support defining two convergent flat inner wall surfaces disposed in opposed positions in planes normal to said flat inner surface of the base and to said flat surface portion of the electrical box; and an end wall extending between said side walls and defining, with said convergent wall surfaces, said base, and said flat surface portion of the electrical box, a rectangular section cavity of truncated triangular shape in plan having an opening between said side walls to receive said screw;
    a pair of generally wedge-shaped screw-engaging members disposed side by side in said cavity for sliding movement between said inner surface of the base and said flat surface portion of the electrical box; each screw-engaging member including: flat parallel top and bottom faces; two opposite side faces, a first one of which extends parallel to the corresponding face of the other screw-engaging member, and the second one of which extends at an inclination with respect to said first face and parallel to the relevant one of said convergent wall surfaces of the support for sliding movement along said surface, the said first face of the screw-engaging member including co-operating recesses having internal grooves in which together define a thread complimentary to that of a screw to be received in said screw fastening device; and,
    spring means extending between said end wall of the support and said screw-engaging members and biassing said members in the direction of convergence of said convergent wall surfaces of the support so as to maintain said first faces of the members in co-operating relationship and said second face in sliding contrast with said convergent wall surfaces;
    whereby said screw can be inserted between said screw-engaging members, causing alternate relative movement of the members along said convergent wall surfaces of the support in directions against the biassing effect of the spring means and back to their normal positions under the action of said spring means as the thread on the screw rides over the corresponding thread defined by said recesses, the screw being held in its inserted position by said screw-engaging members and the thread defined by said recesses allowing the screw to be axially displaced by rotation in the appropriate direction.

2. The combination claimed in claim 1, wherein each of said screw-engaging members of the device includes a front end face disposed in a plane at right angles to a plane containing said first face of the member, and a rear end face, said rear end faces of the screw-engaging members being engaged by said spring means, and being inclined outwardly with respect to one another at a shallow angle so as to laterally locate said spring means.

3. The combination claimed in claim 2, wherein said end wall of the support comprises an initially-separate end plate arranged in opoosed relationship with respect to said rear end faces of the screw-engaging members, and wherein said spring means is defined by a helical compression spring extending between said plate and said rear end faces of the screw-engaging members.

4. The combination claimed in claim 1, wherein said support and screw-engaging members are made of a plastic material.

5. The combination claimed in claim 1, wherein the electrical box is of rectangular shape and defines parallel top and bottom walls having flat inner surfaces, and wherein one of said screw fastening devices is fitted to each of said inner surfaces of the top and bottom walls of the box to receive screws inserted from the front of the box for securing an electrical receptacle and the like to the box.

* * * * *